(12) United States Patent
Godar

(10) Patent No.: US 8,750,599 B2
(45) Date of Patent: Jun. 10, 2014

(54) STEREOSCOPIC IMAGE PROCESSING METHOD AND APPARATUS

(75) Inventor: Anthony William Godar, London (GB)

(73) Assignee: Sony Computer Entertainment Europe Limited (GB)

( * ) Notice: Subject to any disclaimer, the term of this patent is extended or adjusted under 35 U.S.C. 154(b) by 9 days.

(21) Appl. No.: 13/377,675

(22) PCT Filed: Jun. 10, 2010

(86) PCT No.: PCT/GB2010/050975
§ 371 (c)(1),
(2), (4) Date: Jan. 17, 2012

(87) PCT Pub. No.: WO2010/146384
PCT Pub. Date: Dec. 23, 2010

(65) Prior Publication Data
US 2012/0105611 A1  May 3, 2012

(30) Foreign Application Priority Data

Jun. 19, 2009  (GB) .................................. 0910660.0

(51) Int. Cl.
*G06K 9/00* (2006.01)
*H04N 13/00* (2006.01)
*H04N 13/04* (2006.01)

(52) U.S. Cl.
CPC ....... *H04N 13/0003* (2013.01); *H04N 13/0018* (2013.01); *H04N 13/0468* (2013.01)
USPC ................................. 382/154; 348/E13.045

(58) Field of Classification Search
CPC ..................... G06T 19/00; G06T 2207/10012; G06T 2210/41; G06T 3/40; H04N 13/04; H04N 13/0022; H04N 2013/0081; H04N 13/0018; H04N 13/0425

USPC .......... 378/44, 45, 62, 165, 21, 4, 46, 50, 57, 378/65, 86, 87; 345/419; 348/51, E13.029, 348/E13.026, E13.064, E13.027, E5.055, 348/60

See application file for complete search history.

(56) References Cited

U.S. PATENT DOCUMENTS

| 6,061,083 | A | 5/2000 | Aritake et al. |
| 6,191,808 | B1 | 2/2001 | Katayama et al. |
| 2001/0033327 | A1 | 10/2001 | Uomori et al. |
| 2003/0083551 | A1 | 5/2003 | Takahashi |
| 2003/0107645 | A1 | 6/2003 | Yoon |
| 2004/0233275 | A1* | 11/2004 | Tomita ............................ 348/51 |

(Continued)

FOREIGN PATENT DOCUMENTS

| DE | 19528425 C1 | 5/1996 |
| EP | 0805388 A1 | 11/1997 |

(Continued)

OTHER PUBLICATIONS

International Search Report, PCT/GB2010/050975, dated Aug. 5, 2010.

(Continued)

*Primary Examiner* — Sath V Perungavoor
*Assistant Examiner* — Dakshesh Parikh
(74) *Attorney, Agent, or Firm* — Lerner, David, Littenberg, Krumholz & Mentlik, LLP

(57) ABSTRACT

A stereoscopic image processing method for a stereoscopic image pair forming a 3D image comprises the steps of evaluating whether the distance of a user is closer or further than a preferred distance from a 3D image display upon which the stereoscopic image pair is to be displayed, and if the evaluation indicates that the user is further than the preferred distance from the 3D image display, adjusting the respective displacements between corresponding image elements in the stereoscopic image pair, thereby changing the stereoscopic parallax in the 3D image.

13 Claims, 9 Drawing Sheets

(56) References Cited

U.S. PATENT DOCUMENTS

2005/0089212 A1* 4/2005 Mashitani et al. ............ 382/154
2006/0012674 A1 1/2006 Kao
2006/0203085 A1 9/2006 Tomita

FOREIGN PATENT DOCUMENTS

| | | |
|---|---|---|
| EP | 1168852 A1 | 1/2002 |
| EP | 1328129 A1 | 7/2003 |
| JP | 2005-033428 A | 2/2005 |
| WO | 2007/003791 A1 | 1/2007 |

OTHER PUBLICATIONS

Search Report from GB Application No. 0910660.0, dated Jul. 10, 2009.

* cited by examiner

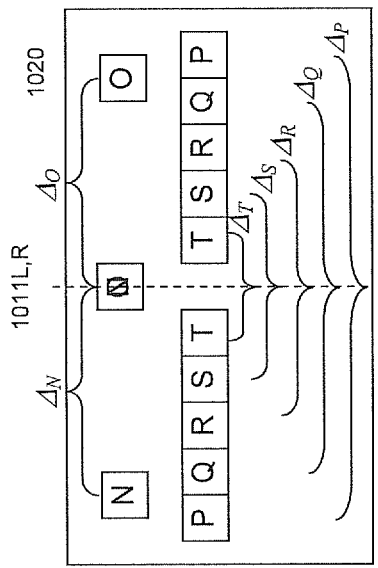
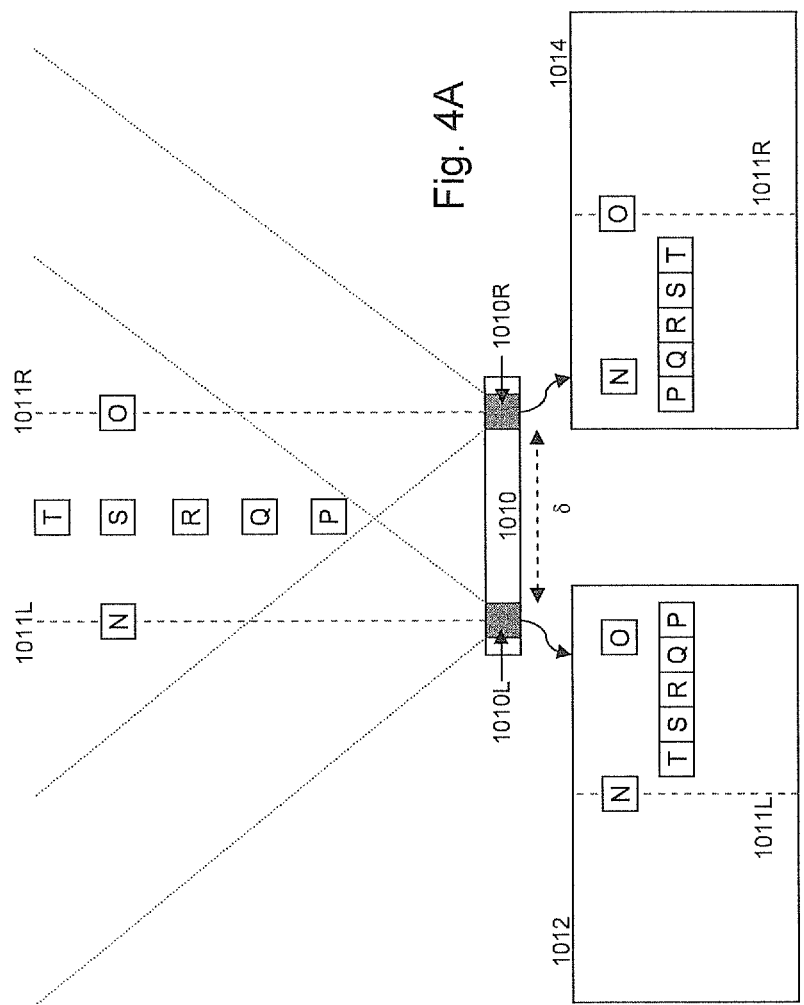
Fig. 4B
Fig. 4A

STEREOSCOPIC IMAGE PROCESSING METHOD AND APPARATUS

CROSS REFERENCE TO RELATED APPLICATIONS

The present application is a national phase entry under 35 U.S.C. §371 of International Application No. PCT/GB2010/050975 filed Jun. 10, 2010, published in English, which claims the benefit of and priority to GB Patent Application No. 0910660.0, filed Jun. 19, 2009, the entire disclosures of which are hereby incorporated by reference herein.

The present invention relates to a stereoscopic image processing method and apparatus.

Three-dimensional (3D) or stereoscopic display technologies are now available to the domestic user. Traditionally these have required the use of glasses with rapidly switching LCDs that are synchronised with alternating view points shown on a display, but recently displays have also been demonstrated that provide a 3D effect without the need for glasses, by use of lenticular lenses on the display panel.

In either case, this provides a means by which a user can view 3D content in their own home.

However, 3D content is recorded using a stereoscopic camera having a fixed arrangement of lenses that presuppose a corresponding fixed viewing position. Typically this is arranged to correspond with the centre of an average cinema auditorium, though as a domestic three dimensional television (3DTV) market grows then alternatively it may be arranged to correspond with a typical domestic viewing position.

However, in this latter case, the viewer or viewers may not be located in the optimal position to recreate the viewpoint recorded by the stereoscopic camera. The result is that the reproduced image can feel unnatural and in extreme cases may lead to headaches or nausea. In particular, one common perceived effect is the under- or over-exaggeration of depth, depending on how near or far the user is from the screen at the time of viewing.

The present invention seeks to address or mitigate the above problem.

In a first aspect of the present invention, a stereoscopic image processing method is provided in accordance with claim 1.

In another aspect of the present invention, an entertainment system for a stereoscopic image display is provided in accordance with claim 10.

Features of the above aspects disclose that elements of the image may be shifted to generate a different 3D effect more suitable to a viewer's current position.

Advantageously, the entertainment system or a device implementing the method can therefore respond accordingly when the viewer(s) are not sat at a preferred distance from a screen where the default 3D effect has preferable characteristics, so mitigating the problem of under- or over-exaggeration of perceived depth.

Further respective aspects and features of the invention are defined in the appended claims.

Embodiments of the present invention will now be described by way of example with reference to the accompanying drawings, in which:

FIGS. 4A and 4B are schematic diagrams of a stereoscopic camera and captured stereoscopic images;

A stereoscopic image processing method and apparatus are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

In an example embodiment of the present invention, an entertainment device such as a Sony® Playstation 3® device reproduces pre-recorded stereoscopic video for a stereoscopic television. The stereoscopic video comprises left-eye and right-eye images whose separate points of view give rise to displacements between corresponding image elements of these images, which in turn gives rise to apparent depth in the resulting stereoscopic image when viewed by a user. The separation in apparent depth between different image elements is a consequence of the different displacements between different pairs of corresponding image elements and hence is also a function of the size of the screen and the distance of the viewer from the screen, both of which serve to scale the perceived displacements. Hence for a given size of screen there is an ideal distance for the viewer at which the displacements and hence relative depth of image elements are correct. However, when the viewer is sat, for example, too far from the screen, it is impractical to compensate for this by increasing the size of the screen. Consequently in the example embodiment the entertainment device, having the size of the television screen and a measure of the viewer's distance, or alternatively having performed a calibration process, re-composes the stereoscopic image to generate new displacements between the corresponding image elements of the stereo image pair, thereby generating a new ideal distance from the screen that substantially coincides with the actual distance of the viewer. This is done by shifting image elements in at least one of the left-eye and right-eye images to change the size of displacements, as a function of the existing displacements, and hence the point of intersection of lines of sight between the corresponding image elements and the viewer, so that the separation in depth between different image elements is substantially the same as it would have been if the user had been viewing the original stereoscopic video at the original ideal distance.

Figure 1:
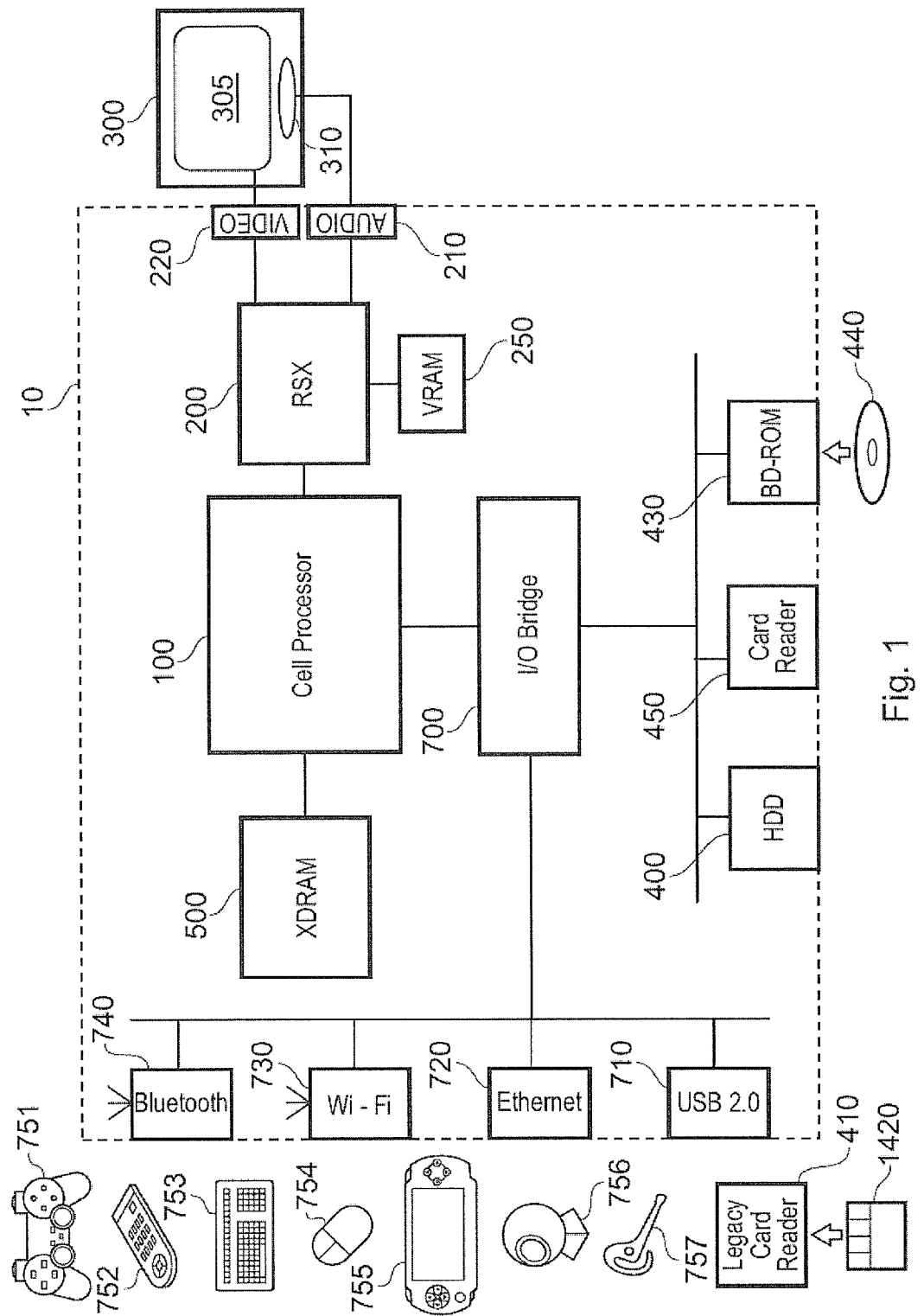
FIG. 1 is a schematic diagram of an entertainment device.

FIG. 1 schematically illustrates the overall system architecture of a Sony®Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. In embodiments of the present invention, the video camera is a stereoscopic video camera 1010. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 2:
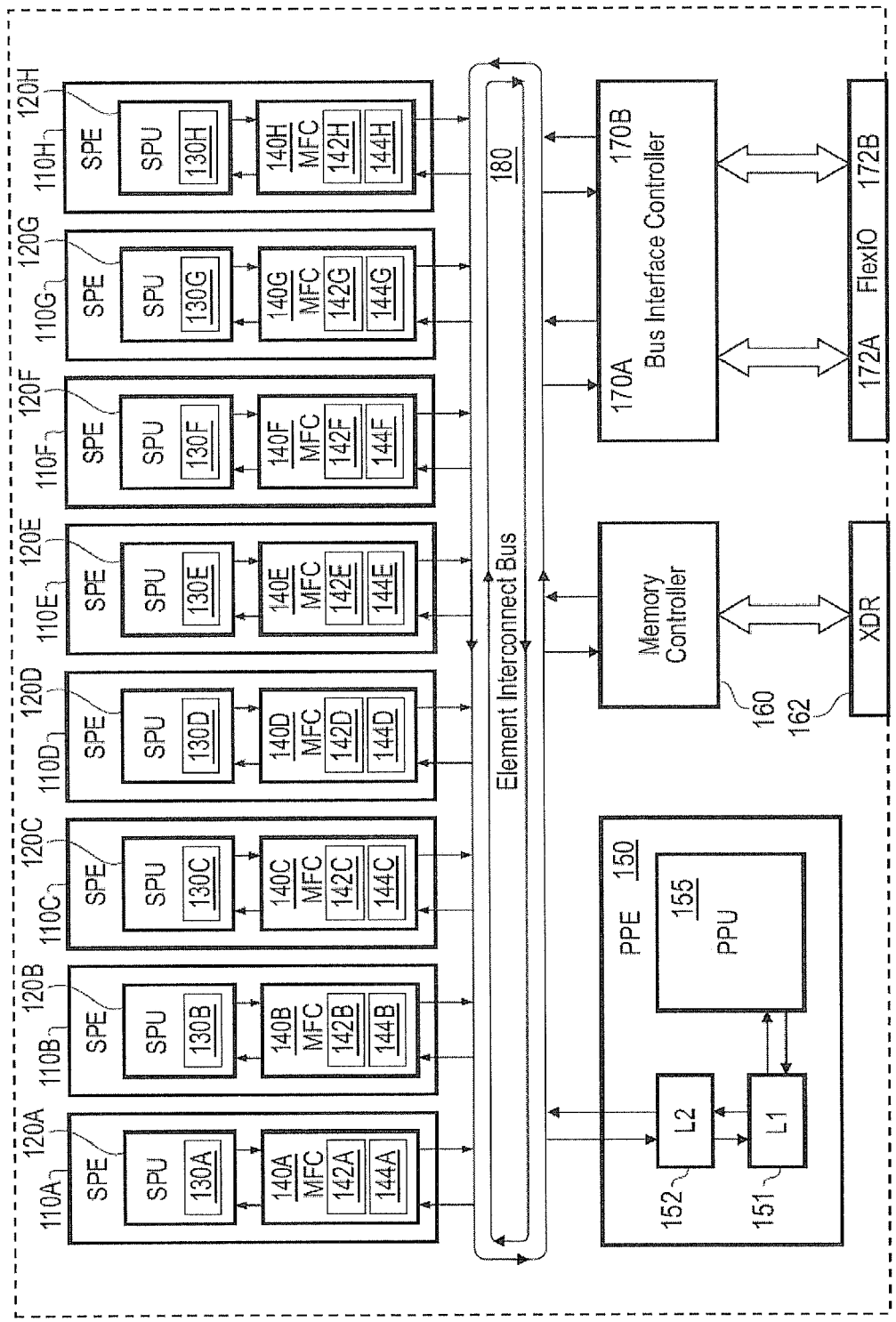
FIG. 2 is a schematic diagram of a cell processor.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totalling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
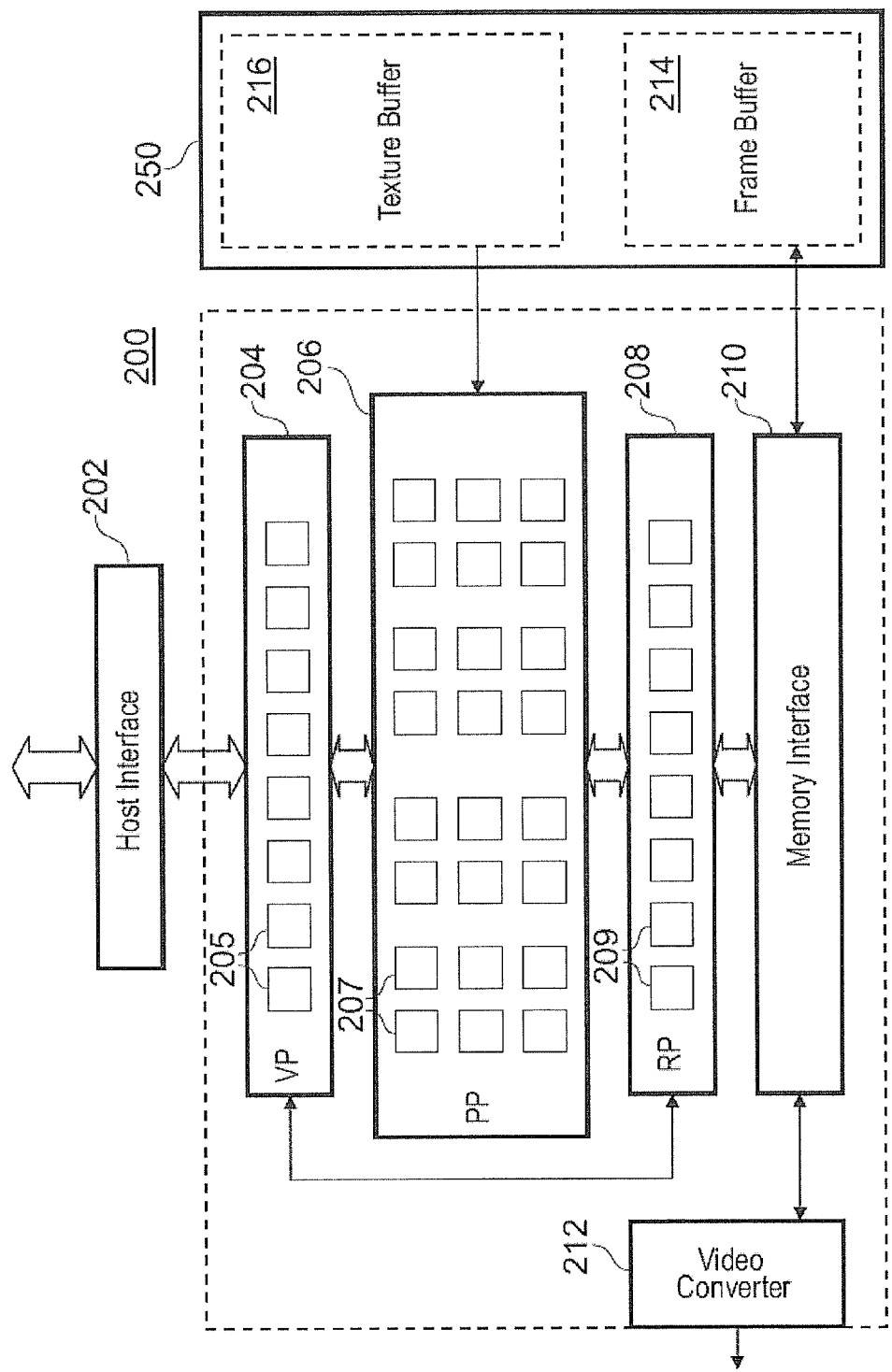
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Referring now to FIGS. 4A and 4B, in conventional stereoscopic image generation a stereoscopic video camera 1010 comprises left and right monoscopic video cameras 1010L and 1010R that together generate a pair of images whose viewpoints are separated by a known distance 6 equal to average eye separation, and hence have respective viewpoint centrelines 1011L and 1011R. In FIG. 4A, both monoscopic cameras 1010L, 1010R of the stereoscopic camera are looking at a set of objects P, Q, R, S and T positioned at successively greater distances from the cameras, and two additional objects N and O (assumed for the purposes of explanation to be positioned above the other objects). As can be seen in the resulting pair of left and right images 1012 and 1014 respectively generated by the left and right monoscopic cameras 1010L, 1010R, the different image viewpoints result in a different apparent arrangement of the of the objects in the image from each monoscopic camera.

In FIG. 4B, an image 1020 superposing the stereoscopic pair of images 1012 and 1014 illustrates that the displacements $\Delta_N$, $\Delta_O$ and $\Delta_T$ to $\Delta_P$ between the objects within the image pair 1012 and 1014 (illustrated by brackets between respective instances of each object) are inversely related to the distance of the object from the stereoscopic video camera as illustrated in FIG. 4A.

Subsequently, the stereoscopic image pair is displayed via a display mechanism (such as alternate frame sequencing and glasses with switchably occluded lenses, or lenticular lensing on an autostereoscopic display screen) that delivers a respective one of the pair of images (1012, 1014) to a respective eye of the viewer, and the object displacement between the images delivered to each eye causes an illusion of depth in the viewed content.

This relative displacement between corresponding image elements of the left- and right-image is also referred to in stereoscopy as parallax (as distinct from the visual effect of objects at different distances panning at different speeds, also sometimes known as the parallax effect). In the context of stereoscopy, so-called 'positive parallax' causes an object to appear to be within or behind the plane of the screen, and in this case the displacement is such that a left eye image element is to the left of a right eye image element. Meanwhile, 'negative parallax' causes an object to appear to be in front of the plane of the screen, and in this case the displacement is such that a left eye image element is to the right of a right eye image element, as is the case in FIGS. 4A and 4B. Finally, 'zero parallax' occurs at the plane of the screen, where the user focuses their eyes and hence there is no apparent displacement between left and right image elements.

Figure 5A:
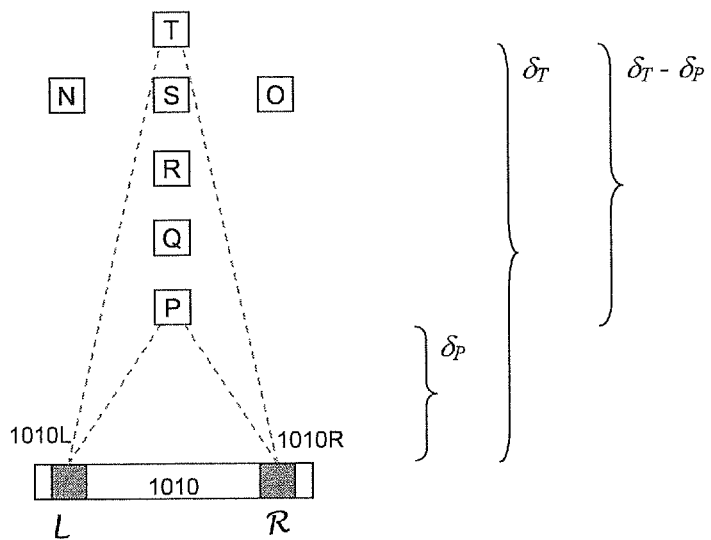
FIG. 5A is a schematic diagram of a stereoscopic camera.
Figure 5B:
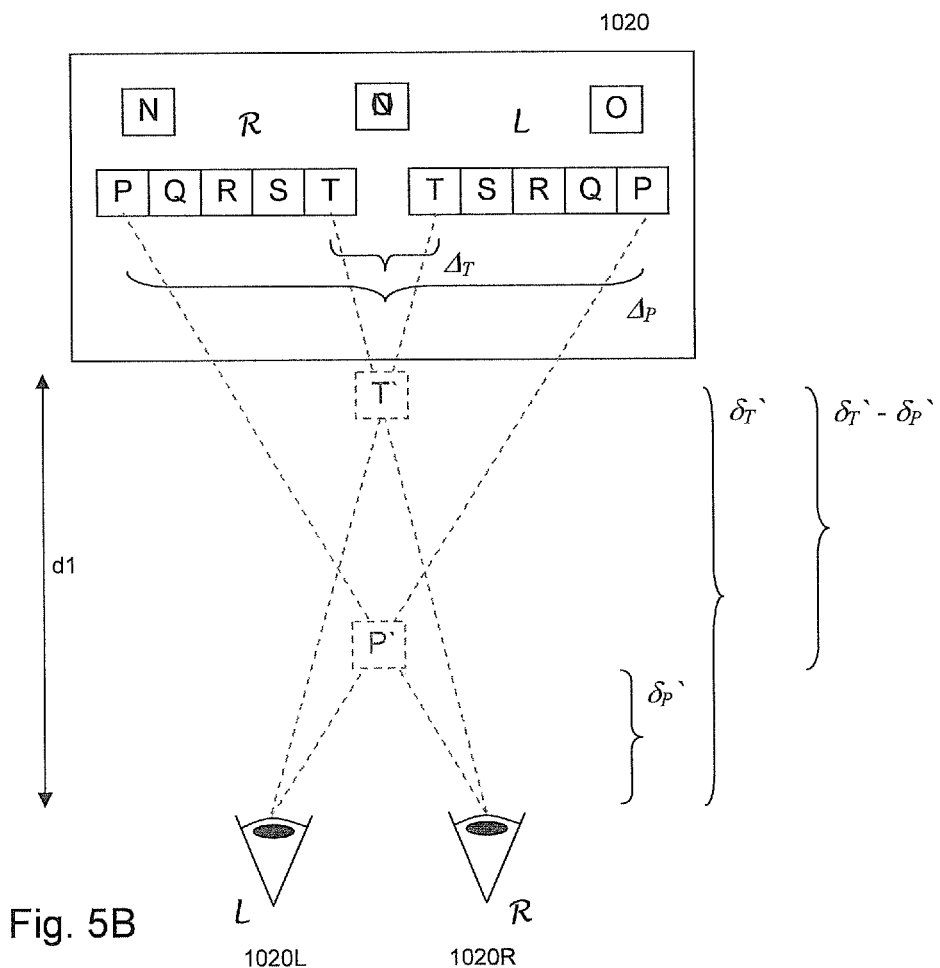
FIGS. 5B and 5C are schematic diagrams of a viewed stereoscopic image.

Referring now to FIGS. 5A and 5B, the display mechanism and the position of the viewer in combination determine whether the apparent distance of the objects is faithfully reproduced. Firstly, the size of the display acts as a scaling factor on the apparent displacement (parallax) of the objects; as a result a large screen (such as in a cinema) requires a greater distance from the user (i.e. in the cinema auditorium) to produce the appropriate parallax. Meanwhile a smaller screen such as that of a domestic television requires a smaller distance.

FIG. 5A illustrates a similar arrangement of stereoscopic camera and objects to that described in FIG. 4A. For the purposes of clarity, reference is made below only to objects P and T, but it will appreciated that the following holds true for all stereoscopic image elements. In FIG. 5A, the respective distances from the objects P and T to the stereoscopic camera 1010 are shown by curly brackets labelled $\delta_P$ and $\delta_T$, which correspond to the depth of the viewing paths shown by dotted lines from the respective monoscopic cameras 1010L, 1010R to each of objects P and T. As described previously, these respective distances result in differently sized displacements for the objects between the images captured by the two monoscopic cameras of the stereoscopic camera, illustrated by brackets $\Delta_P$ and $\Delta_T$ between respective instances of P and T seen in the superposition of the left and right captured images from the two monoscopic cameras forming the stereoscopic image 1020 of FIG. 5B. In this case, both objects show negative parallax.

As seen in FIG. 5B, there is a small displacement $\Delta_T$ (negative parallax) for distant object T and a large displacement $\Delta_P$ (negative parallax) for nearby object P.

With a suitable 3D display arranged to project the image from the left-hand monoscopic camera to the viewer's left eye, and the image from the right-hand hand monoscopic camera to the viewer's right eye, then the viewer's brain interprets the position of the perceived objects as being located at the point of intersection of the respective lines of sight (shown by dotted lines) from each eye 1020L, 1020R to the perceived object as depicted in each image, as shown in FIG. 5B by the positions of apparent 3D objects P' and T' at these intersections in front of the stereoscopic image 1020. In this Figure, these are at apparent distances $\delta_P'$ and $\delta_T'$ from the user (again denoted by curly brackets).

Where the size of display relative to the distance d1 of the user from the display is correct, as it is in FIG. 5B, then distance $\delta_P' \approx \delta_P$ and distance $\delta_T' \approx \delta_T$. Moreover, the relative distance between these objects ($\delta_T' - \delta_P'$) is substantially the same as in the original scene of FIG. 5A ($\delta_T - \delta_P$). Consequently in this case the sense of depth experienced by the viewer feels correct and natural, with no apparent distortion in the separation of depth between apparent 3D objects or image elements in or out of the plane of the image.

Figure 5C:
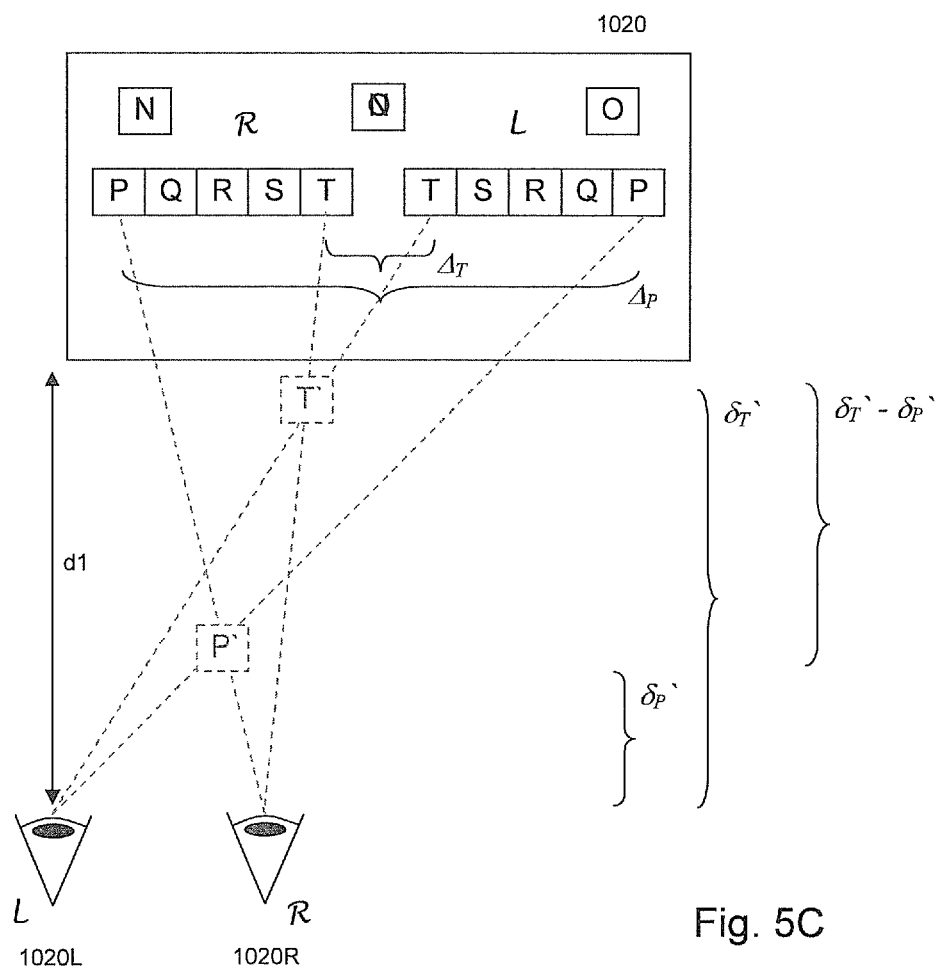

Notably the apparent depth is basically correct as long as the distance d1 of the user from the display is correct for the current screen size, even if the user is not central to the image; as can be seen in FIG. 5C, where again $\delta_P' \approx \delta_P$, $\delta_T' \approx \delta_T$ and $(\delta_T'' - \delta_P') \approx (\delta_T - \delta_P)$, all else being equal to FIG. 5B.

It will be appreciated that in this case for the sake of explanation the effective magnification of the captured scene is 1:1. Of course typically different scenes may zoom in or out, and different screen sizes also magnify the reproduced image. Thus more generally the apparent depth is correct if the apparent scale (magnification) along the depth or 'Z' axis (into and out of the image plane) is the same as the apparent scale in the 'X' and 'Y' axis across the image plane.

Figure 6:
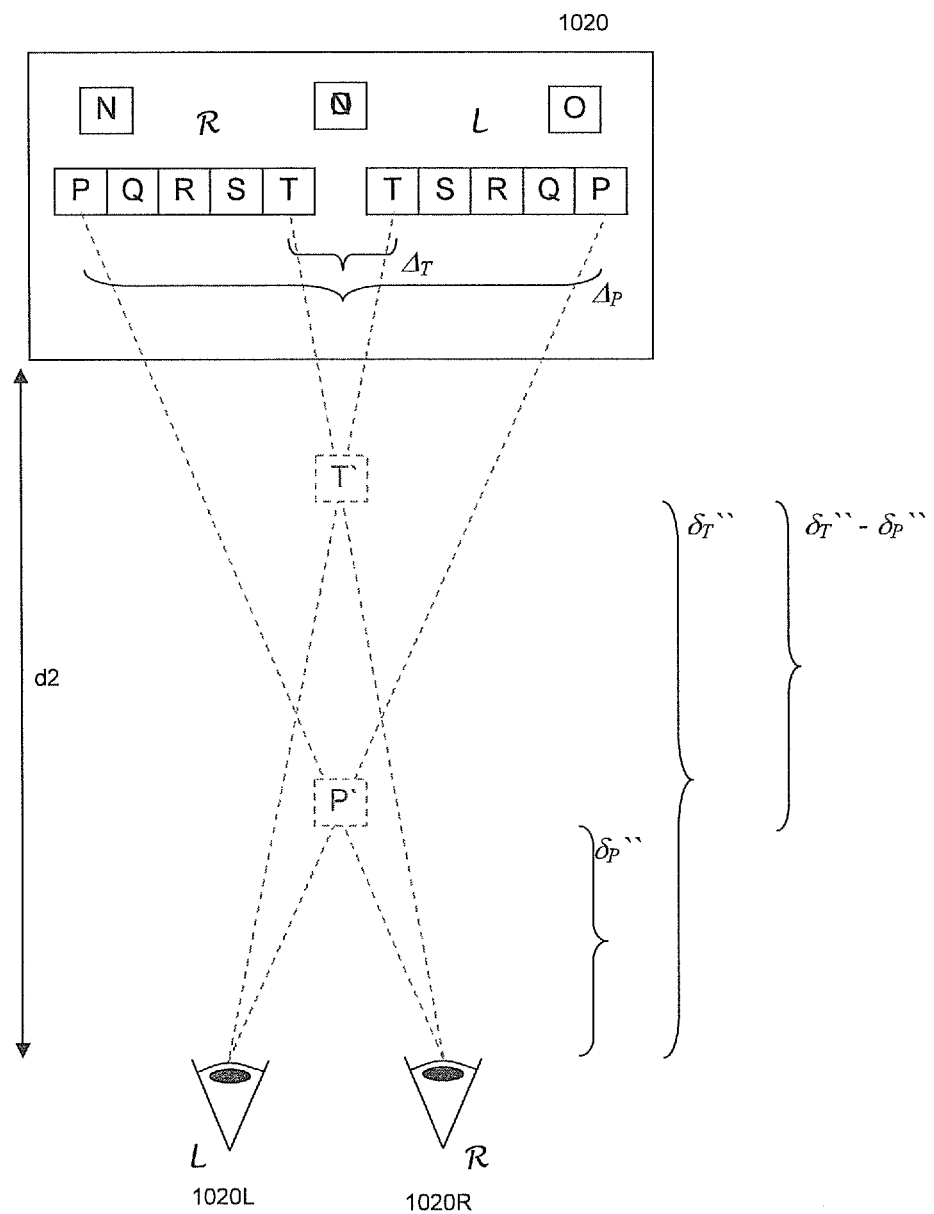
FIG. 6 is a schematic diagram of a viewed stereoscopic image.

However, referring now to FIG. 6, which adopts the same conventions as FIGS. 4B and 5B, when the viewer is not at the correct distance from the screen d2>d1 (or conversely the screen is the wrong size for the viewer's distance) then the apparent distances $\delta_P''$ and $\delta_T''$ of the apparent 3D objects P' and T' at the points of intersection of lines of sight are no longer correct, and moreover the relative separation between these apparent 3D objects ($\delta_T'' - \delta_P''$) is no longer correct, being larger than ($\delta_T - \delta_P$). This latter error creates an unnatural perception of depth where, for the example of FIG. 6, depths are stretched, and so for example during playback of stereoscopic footage a car will appear longer when driving towards the viewer than when driving transversely past the viewer. In other words, the distorted 3D effect magnifies the Z direction relative to the X or Y direction in the 3D image, so that there is a disparity between the objects moving in or out of the image plane with respect to those moving within the image plane. Consequently the viewer may develop a headache or nausea as a result of such unnatural apparent changes to their view, particularly when the objects and/or the camera viewpoint moves or rotates between the currently displayed X, Y and Z axes.

In FIG. 6 the viewer is shown as too far from the screen or, alternatively, the screen is too small. If in the case of FIG. 6 the screen were roughly 75% larger than that shown, then in combination with the user's distance d2 the various factors would again cause $\delta_P''$, $\delta_T''$ and ($\delta_T'' - \delta_P''$) to approximate the correct respective distances, relative to any overall magnification of the X, Y and Z planes.

Consequently, in an embodiment of the present invention the distance of the viewer is detected using, for example, a video camera such as the EyeToy camera coupled with a remote distance measuring system, such as an infra-red emitter and detector. Such combined devices are currently available, such as for example the so-called 'z-cam' from 3DV Systems (http://en.wikipedia.org/wiki/ZCam). Alternatively a stereoscopic video camera can be used to determine the distance of the user based on the same displacement measurements noted for the stereoscopic images as described above. Another alternative is to use a conventional webcam or Eye-Toy camera and to use known face recognition techniques to identify faces or heads of viewers, and from the image size of the identified faces or heads to generate a measure of viewer distance from the display screen. In any of these cases, the relative position of the camera with respect to the 3D image display is also known, so that the distance from the viewer to the 3D image can be computed.

In addition, in an embodiment of the present invention the effective size of the user's TV screen is recorded or noted by the entertainment device, either during some user registration process on the entertainment device (during which the user is asked to specify the screen size) or via an electronic handshake (e.g. an HDMI handshake) between the entertainment device and the television. In an embodiment of the present invention, whilst an industry-standard lens separation for the stereoscopic media may be assumed, such information may also be encoded or associated with the media being played back. Finally, in an embodiment of the present invention the user's eye separation may be gauged from video capture using an Eye-Toy/z-cam, or an average may be assumed.

As noted above, for each screen size (or image reproduction size) there will be a corresponding ideal or preferred viewing distance, optionally modified by available information relating to any non-standard camera lens separation, and optionally the viewer's eye separation. Optionally such preferred distance values may be pre-computed and stored.

Therefore using the above obtained information, a preferred viewing distance to reproduce a good perception of depth can be obtained as described herein. The PS3 can then evaluate whether the distance of the user is closer or further than a preferred distance from the 3D image display upon which the stereoscopic image pair forming the 3D image is to be displayed, and tell the viewer how much nearer or further to the screen they should move to get the best viewing experience.

Of course, in practice a viewer may not wish or may not be able to move from their current viewing position.

Thus in an embodiment of the present invention, where the viewing distance cannot be adjusted and the user is too close to the screen, instead the displayed image is scaled down to restore the balance of factors between the apparent image size and viewer distance, as outlined above.

However, where the viewing distance cannot be adjusted and the evaluation by the entertainment device shows that the user is too far from the screen, it is unlikely that the converse option of making the image larger will be available, as the image is already likely to occupy the full width of the screen. An alternative technique is therefore provided. This technique may be invoked if there is even a very small deviation between the preferred user separation (for a particular screen size) and the actual user separation, or the entertainment device may provide a threshold so that a correction (as described below) is applied only if the user's separation exceeds the desired separation by at least a threshold distance (e.g. 1 m) or by at least a threshold proportion (e.g. 10% of the desired distance).

Referring now to FIG. 7, which again adopts the same conventions as FIGS. 4B, 5B and 6, in an embodiment of the present invention a solution to this problem is to dynamically recompose the stereoscopic image so as to change the effective parallax in the images, and hence the effective viewpoint of one or both monoscopic cameras of the stereoscopic camera. This is achieved by the entertainment device obtaining and adjusting the respective displacements between corresponding image elements in a stereoscopic image pair, thereby changing the stereoscopic parallax in the 3D image. Appropriate adjustment in this way can be used to restore the relative depth scale for the reproduced material for the viewer.

Figure 7:
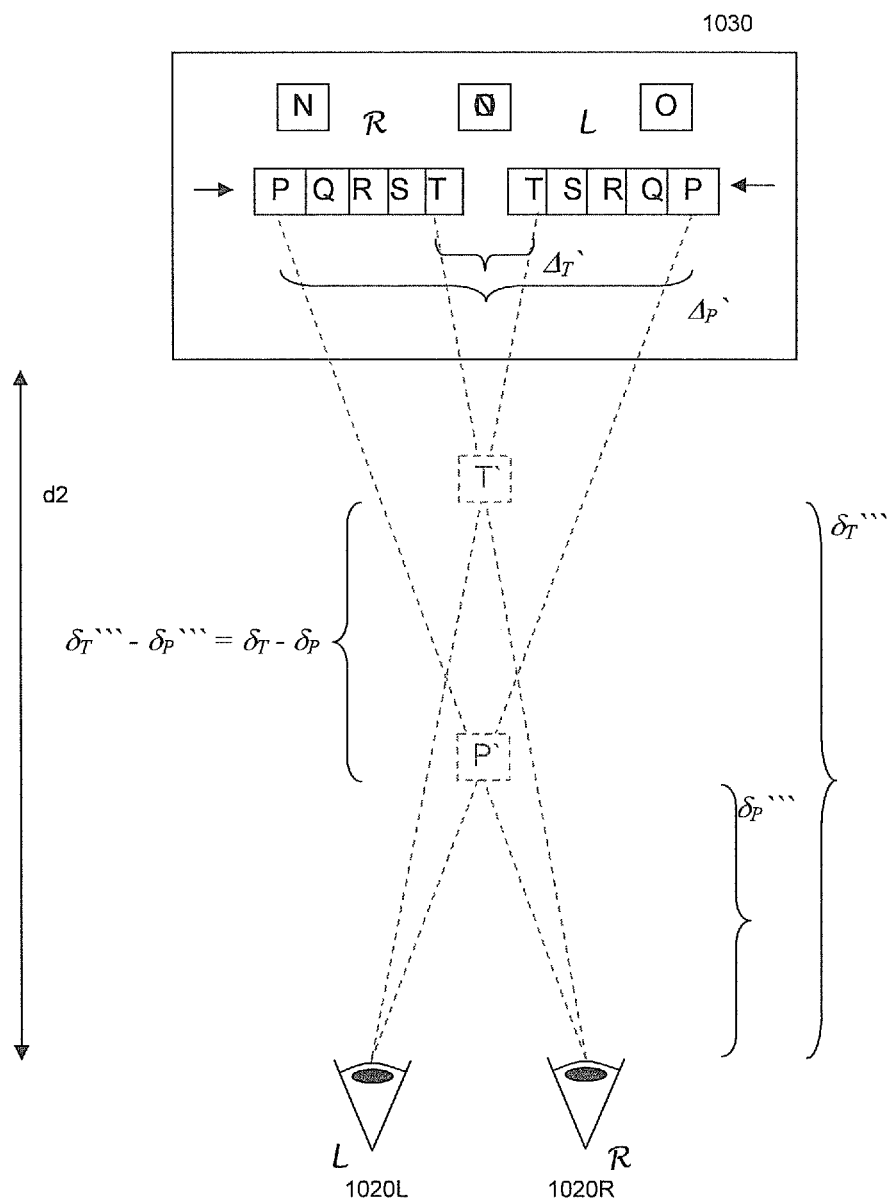
FIG. 7 is a schematic diagram of a viewed modified stereoscopic image in accordance with an embodiment of the present invention.

In FIG. 7, the objects P to T, N and O have been individually repositioned within their respective left and right stereoscopic images (as summarised by the combined recomposed stereoscopic image 1030 in FIG. 7) as a function of their original displacements $\Delta_N$, $\Delta_O$ and $\Delta_T$ to $\Delta_P$ within the stereoscopic image pair, and hence their original distance. Thus for example it will be apparent from recomposed stereoscopic image 1030, when compared to the original stereoscopic image 1020 of FIG. 6, that the image elements corresponding to object P have been moved more than those elements corresponding to object T, reflecting the fact that original displacement $\Delta_P$ is significantly larger than original displacement $\Delta_T$. That is to say, in the recomposed image 1030 the new displacement $\Delta_T'$ between instances of the object T is only slightly smaller than original displacement $\Delta_T$, whilst the new displacement $\Delta_P'$ between instances of the object P is significantly smaller than original displacement $\Delta_P$. As noted above, the displacement or parallax relates to the perceived distance of an object and so here different relative adjustments in displacement between objects T and P in the recomposed image 1030 mean that the position of apparent 3D object P' is effectively pushed further back towards the apparent 3D object T' along the user's new intersecting lines of sight.

More significantly, however, as a result the new distance $\delta_T'''$ of apparent 3D object T', minus the new distance $\delta_P'''$ of apparent 3D object P', is now restored to approximately the correct relative distance. That is to say, $(\delta_T'''-\delta_P''')\approx(\delta_T-\delta_P)$. As a result the parallax within the image is again consistent and, for example, the length of a car within reproduced stereoscopic footage will remain the same independent of the direction it is moving. As a result the scale of the Z-axis appears to be consistent with the scale of the X and Y axes.

Thus in summary, in an embodiment of the present invention the effective parallax or viewpoint of one or both of the monoscopic cameras of the stereoscopic camera is moved to compensate (at least in part) for the non-optimal position of the user with respect to the display; that is, image elements are moved to generate new displacement values that cause the relative depth between objects to be similar to that which would have been seen in the unaltered 3D image if viewed at the ideal (preferred) viewing distance for the size of screen. This restores the effective consistency of scale between the X, Y and Z axes.

To achieve this in practice, for a 3D videogame the stereoscopic camera is virtual and so virtual monoscopic camera separation can be configured dynamically during the generation of the game images. This of course serves to move the image elements in the stereoscopic image pair, thereby automatically compensating for the distance of the gamer with respect to the display by changing the stereoscopic parallax in a similar manner to that described herein.

Hence, also, in an embodiment of the present invention, alternatively or in addition to detecting the size of the television screen and the user's distance to it, a calibration process can display a set of 3D virtual objects to the user as alternative versions of a 3D calibration image, with each version based upon alternative (i.e. different) respective pre-adjusted (i.e. assumed) monoscopic camera separation for the virtual stereoscopic camera, and hence different displacements between left and right image elements. Typically the object used will be one with 3D properties well-known to the user, such as a slowly rotating cube.

The user may then choose which instance of the cube looks most natural to them (for example by displaying three cubes and asking the user to select 1, 2 or 3 on their remote control, where the cubes representing the different options are rendered for viewing with correct parallax at different respective viewing distances). In this way any deviation from the existing displacements required by the user can be detected and used by the above described dynamic parallax adjustment (image recomposition) process to adjust the respective displacements in response to the selected version of the 3D calibration image, and so mitigate depth distortion. Optionally, the user may alternatively or additionally be able to directly modify the 3D displacement of the left and right images of a cube, for example using an 'up/down' control on a remote control.

Thus more generally, using either the combination of screen size and viewer distance, or a calibration process, it is possible to evaluate whether the distance of the user is closer or further than a preferred distance from the 3D image display, and if the evaluation indicates that the user is further than the preferred distance from the 3D image display, adjusting the respective displacements between corresponding image elements in the stereoscopic image pair of a 3D image to be displayed on the 3D image display, thereby changing the stereoscopic parallax in the 3D image, preferably so that the apparent separation (as perceived by the user at that viewing position for that screen size) in depth between different image elements has the same scale as that of the plane of the image.

However, for pre-recorded stereoscopic footage, the recording has already occurred and so the actual monoscopic camera separation in the source material is fixed. Consequently, adjusting the respective displacements between corresponding image elements in the stereoscopic image pair of a pre-recorded 3D image is more difficult.

Referring again to FIGS. 4A and 4B, however, note that it is apparent from the superposed left and right hand images 1020 that the true position of the objects with respect to a perpendicular centreline equidistant between the monoscopic cameras of the stereoscopic camera is simply the average of their apparent positions in the stereoscopic pair of images.

Thus from the source stereoscopic image pair, it is possible to estimate the distance of a picture element from its respective relative displacement between the images, and to estimate its true position from the average of its position in the images. Determining the correspondence between the images for the image elements themselves may be achieved using known analysis techniques such as block matching and cross-correlation. Alternatively such correspondence may be provided as a supplementary data track with the recording, for example formatted as a third 'image' of displacement values (i.e. an array of displacement values corresponding in array size to the image size of the monoscopic images, so that there is one displacement value corresponding to each pixel value) indicating the respective parallax (displacement or shift) of a corresponding pixel from, say, the left-eye image, to the right-eye image.

Using such information it is then possible to generate or synthesise a new pair of stereoscopic images, using as a non-limiting example the image elements corresponding to objects P to T, N and O as seen in FIG. 7, for any angle of deviation from a perpendicular centreline equidistant between the monoscopic cameras of the stereoscopic camera, out to the original angle of the respective monoscopic cameras.

Therefore it is possible to generate a new effective viewpoint for one (or preferably both) of the monoscopic cameras of the stereoscopic camera that delivers a parallax appropriate to the position of the viewer; or to put it another way, it is possible to adjust the displacements between image elements in the stereoscopic image pair to adjust the relative depths between objects so that they behave consistently in the X, Y and Z directions in the manner described previously herein.

During such image generation, it will be appreciated that the left and right images of the original stereoscopic image pair contain complementary background details. For example, the region of a background obscured by object P in left-eye image 1012 is visible in right-eye image 1014 (in the supplementary data format described previously, such background data with no direct correspondence in the other image of an image pair may be signified by a value outside an accepted range, for example greater than 1,920, if 1920 is the maximum left-to-right displacement in an HD standard image).

In general, for viewpoint angles lying between those of the monoscopic cameras of the stereoscopic camera, there is enough complementary image information (including for the background) available in at least one of the monoscopic images to construct a new image completely. In other words, the overlapping view points of the original image pair provide redundancy for angles of overlap that might be used during construction of the interpolated images, and for any horizontal deviation up to the angle of the left or right lens there should be image information available for more distant image elements revealed by looking from a different viewpoint.

Optionally, historical information about the video may also be used, for example where it is difficult to resolve an object's distance (for example where repeated instances of a pattern may cause a false estimate of distance between repeating instances, or where correlation between instances of an object in a stereoscopic image pair is difficult). In particular, the movement of elements in a sequence of images may be used to resolve such ambiguities. Here, depth becomes apparent from the movement of an image element from frame to frame. For example, as a camera pans across a scene, a wall in the background with a repeating pattern will have a small movement compared to objects in the foreground. Where previously observed depth based on such motion and an analysis of a single stereoscopic image pair disagree on the apparent distance of an object (for example in excess of a predetermined threshold amount), then in an embodiment of the present invention the previously observed depth may be used in preference to compute the distance (and hence also predict or confirm the corresponding image element in the other image of the image pair, based on the displacement value derivable from that distance).

Thus more generally, the relative movement of objects or image elements in a sequence of stereoscopic images can optionally provide distance information to supplement that obtained from analysis of a current stereoscopic image pair.

Similarly, historical information about the previously determined distance of an image element in one or more previous frames, optionally in combination with motion vector data or Kalman filter tracking, can provide a prediction of the distance of the image element in the present image pair. In this case a distance estimate that falls outside a threshold divergence from the predicted distance can be overridden and an extrapolated distance can be used instead. Similarly the distance of an image element in a preceding image pair together with motion vectors can help to identify an image element for which correlation within the current image pair proves difficult; for example when one object moves directly behind another, so that non-overlapping partial views of the object are seen in the stereoscopic image pair.

In each of the above cases, the use of thresholds to constrain or override current estimates may be suspended when overall image activity exceeds a further predetermined threshold; image activity relates to the overall change in content between frames, and increases when image sequences are highly kinetic (e.g. having very different pixel, macroblock or other image descriptor values between successive images, such as when showing an explosion or a fast pan) or when the content changes entirely (thereby punctuating a cut or scene change).

Alternatively or in addition to the above embodiments for pre-recorded media, for devices where the computational load (or power requirements of such computation) involved in the above parallax adjustment techniques are undesirable, the resulting generated images may be prepared in advance and stored as data supplementary to the original stereoscopic recorded media. For example, a total of eight images (the original pair and six generated images) may be stored.

The device then selects whichever stereo image pair will best compensate for the viewer's position with respect to the display, again either as a function of detected screen/image size and user distance, or based upon a calibration process using calibration objects with displacements corresponding to available combinations of image pairs, either generated by the device or pre-recorded. It will be appreciated that more or less than eight images may be chosen, depending on desired quality levels, storage capacity, etc., and that the changes in parallax chosen may not be regularly separated, instead for example being clustered at points that compensate for common configurations of TV size and viewing distance, which may be empirically determined.

Of course, it will be appreciated that the dynamic parallax adjustment (image recomposition) techniques disclosed herein may still be used even where such supplementary data is available, and thus may either discard the supplementary data and only use the original stereoscopic images, or alternatively may operate on any of the available images to provide a refined output.

Thus in summary, the respective displacements between corresponding image elements in the stereoscopic image pair of a 3D image, to be displayed on a 3D image display can be adjusted by obtaining the relative displacement between a pair of corresponding image elements in a stereoscopic image pair of a 3D image (either by an evaluation of cross-correlation between image elements in the stereoscopic image pair, or a similar detection of correspondence, or using supplementary data associated with the 3D image indicating the displacement between corresponding image elements). The new relative displacements for pairs of corresponding image elements are then computed to substantially restore the relative separation in depth between different image elements to the same scale as that of the plane of the image (i.e. make the X, Y and Z axes consistent again).

In particular, this computation generates new relative displacements between corresponding image elements of a left-eye image and right-eye image of a stereoscopic image pair that result in an intersection of lines of sight for the viewer that are separated from each other by distances substantially equal to the relative separation distances of intersections arising from the original 3D image if viewed from the preferred viewing distance.

As noted above, the change in displacement may be achieved by adjusting only one of the left or right images, but is preferably achieved by adjusting both to have the new computed relative displacements to the corresponding image elements of the other image of the stereoscopic image pair, and this or these new images replace the or each image of the original pair of stereoscopic images to be output to the display.

Again as noted above, this can be done dynamically at playback, or for systems with limited resources the recomposition of the images in the above manner can be calculated in advance and the results stored, enabling such devices to simply select from one or more alternative pre-recorded versions of the 3D image a version having pre-adjusted respective displacements between corresponding image elements best suited to the current configuration of displayed image size and viewer distance.

It will be understood that any or all of the various available responses to the viewer's distance (e.g. warning the user, scaling the image or adjusting the parallax) may be implemented on the same system, with, for example, a user interface giving a choice between warning the viewer and automatically correcting for viewer position.

Figure 8:
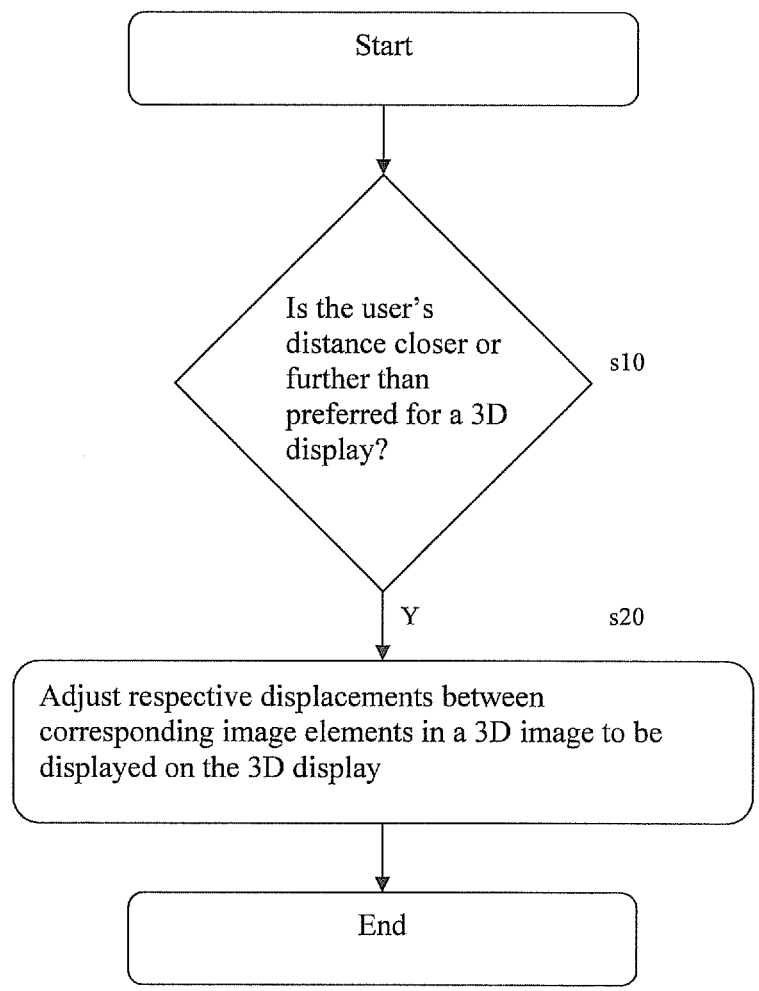
FIG. 8 is a flow diagram of a method of stereoscopic image processing in accordance with an embodiment of the present invention.

Referring now to FIG. 8, a method of stereoscopic image processing for parallax adaptation carried out, for example, by the Cell Processor 100 of the device of FIG. 1 under the control of appropriate software (in turn provided by a storage medium such as an optical disk, memory device or hard disk drive, or via a network or internet connection to the device of FIG. 1) comprises:

in a first step s10, evaluating whether the distance of a user is closer or further than a preferred distance from the 3D image display; and if the evaluation indicates that the user is further than the preferred distance from the 3D image display, in a second step s20, adjusting the respective displacements between corresponding image elements in the stereoscopic image pair of a 3D image to be displayed on the 3D image display, thereby changing the stereoscopic parallax in the 3D image.

It will be apparent to a person skilled in the art that variations in the above method corresponding to operation of the various embodiments of the apparatus and techniques as described and claimed herein are considered within the scope of the present invention, including but not limited to:

informing the user that they are either too close or too far from the 3D image display;

reducing the size of displayed 3D images if the viewer is too close;

adjusting the stereoscopic parallax in a 3D image for display by;

obtaining the relative displacement between a pair of corresponding image elements in a stereoscopic image pair of a 3D image;

computing new relative displacements for pairs of corresponding image elements; and generating at least a first image of a pair of stereoscopic images of a 3D image comprising image elements having the new relative displacements;

selecting from one or more alternative pre-recorded versions of the 3D image a version having a pre-adjusted stereoscopic parallax best suited to the current configuration of image size and viewer distance;

adjusting the stereoscopic parallax of displayed 3D images from a computer game or similar by adjusting the separation of left and right monoscopic cameras of a virtual stereoscopic camera used in generating the 3D images;

using multiple versions of such virtual images for calibration purposes; and in the case that more than one viewer is detected, carrying out the present techniques in respect of an average viewer distance or in respect of a viewer distance for that viewer detected to be closest to a notional centre line projecting as a normal to the display screen.

Finally, it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the faun of a computer program product or similar object of manufacture comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

The invention claimed is:

1. A stereoscopic image processing method for a pre-recorded stereoscopic image pair forming a 3D image, the method comprising the steps of:

evaluating whether the distance of a user is closer or further than a preferred distance from a 3D image display upon which the stereoscopic image pair is to be displayed; and if the evaluation indicates that the user is further than the preferred distance from the 3D image display, recomposing at least one of the stereoscopic pair of images to individually reposition each image element in the stereoscopic image by adjusting parallaxes between corresponding image elements in the stereoscopic image pair as a function of their respective displacements so as to restore relative separation in depth of said image elements to that a consistent with the user viewing the 3D image display at the preferred distance.

2. The method of claim 1, further comprising the step of:

obtaining a relative displacement between a pair of corresponding image elements in a stereoscopic image pair forming the 3D image, in which the relative displacement is obtained from one or more selected from the list consisting of:

i. an evaluation of cross-correlation between image elements in the stereoscopic image pair; and ii. supplementary data associated with the 3D image indicating the displacement between corresponding image elements.

3. The method of claim 2, comprising the step of computing new relative displacements for pairs of corresponding image elements that substantially restores the separation in depth between different image elements to the same scale as that of the plane of the image.

4. The method of claim 3, in which the step of computing the new relative displacements comprises:

computing new relative displacements between corresponding image elements of a left-eye image and right-eye image of a stereoscopic image pair that result in an intersection of lines of sight for a viewer;

and wherein the new relative displacements are computed to generate intersections for different corresponding image elements that are separated from each other by distances substantially equal to the relative separation distances of intersections arising from the original 3D image if viewed from the preferred distance.

5. The method of claim 3 or, further comprising the steps of generating at least a first image of a pair of stereoscopic images of a 3D image comprising image elements having the new computed relative displacements to the corresponding image elements of the other image of the stereoscopic image pair;

replacing each original image of the pair of stereoscopic images with a respective generated image; and outputting the resultant 3D image for display.

6. The method of claim 1, in which the step of adjusting parallaxes between corresponding image elements in the stereoscopic image pair comprises:

selecting from one or more alternative pre-recorded versions of the 3D image a version having pre-adjusted respective displacements between corresponding image elements best suited to the current configuration of displayed image size and viewer distance.

7. The method of claim 1, comprising the step of:

a user selecting a preferred version from one or more alternative versions of a 3D calibration image, the alternative versions having different respective displacements between corresponding image elements of the 3D image; and in which the step of adjusting the respective displacements between corresponding image elements in a stereoscopic image pair of a 3D image adjusts the respective displacements in response to the respective displacements of the selected version of the 3D calibration image.

8. The method of claim 1, comprising the steps of:

receiving data descriptive of the size of a 3D image display; and optically estimating the distance of a viewer from the 3D image display.

9. A tangible non-transitory computer program product on which computer readable instructions of a computer program are stored, the instructions, when executed by a processor, cause the processor to perform a stereoscopic image processing method for a pre-recorded stereoscopic image pair forming a 3D image, the method comprising:

evaluating whether the distance of a user is closer or further than a preferred distance from a 3D image display upon which the stereoscopic image pair is to be displayed; and if the evaluation indicates that the user is further than the preferred distance from the 3D image display, recomposing at least one of the stereoscopic pair of images to individually reposition each image element in the stereoscopic image by adjusting parallaxes between corresponding image elements in the stereoscopic image pair as a function of their respective displacements so as to restore relative separation in depth of said image elements to that a consistent with the user viewing the 3D image display at the preferred distance.

10. An entertainment system, comprising:

a processor operable to evaluate whether a viewer is closer or further than a preferred distance from a 3D image display upon which a pre-recorded stereoscopic image pair forming a 3D image is to be displayed; in which:

if the user is further than the preferred distance from the 3D image display, the processor is operable to recompose at least one of the stereoscopic pair of images to individually reposition each image element in the stereoscopic image by adjusting parallaxes between corresponding image elements in the stereoscopic image pair to be displayed on the 3D image display as a function of their respective displacements so as to restore relative separation in depth of said image elements to that a consistent with the user viewing the 3D image display at the preferred distance.

11. The entertainment system of claim 10, comprising:

a stereoscopic image analyser arranged in operation to determine relative displacements between pairs of corresponding image elements in the stereoscopic image pair; and in which the processor is operable to compute new relative displacements between corresponding image elements of the stereoscopic image pair that result in an intersection of lines of sight for a viewer of the 3D image display for corresponding image elements, the intersections being separated from each other by distances substantially equal to relative separation distances of intersections arising from the original 3D image if viewed from the preferred distance.

12. The entertainment system of claim 10, further comprising:

an optical distance measurer operable to estimate the distance of a viewer from a 3D image display; and a data input operable to receive data descriptive of the size of the 3D image display.

13. The entertainment system of claim 10, further comprising:

a 3D calibration image generator operable to generate one or more alternative versions of a 3D calibration image having different respective displacements between corresponding image elements of the stereoscopic image pair forming the 3D calibration image; and a user input for receiving a selection of a preferred version of the 3D calibration image; wherein the processor is operable to compute new respective relative displacements for pairs of corresponding image elements responsive to the selected version of the 3D calibration image.

* * * * *

UNITED STATES PATENT AND TRADEMARK OFFICE
CERTIFICATE OF CORRECTION

PATENT NO.        : 8,750,599 B2                                   Page 1 of 1
APPLICATION NO.   : 13/377675
DATED             : June 10, 2014
INVENTOR(S)       : Anthony William Godar It is certified that error appears in the above-identified patent and that said Letters Patent is hereby corrected as shown below:

In the Claims

Claim 1, Column 16, line 40, after "that" delete -- a --.
Claim 10, Column 18, line 1, after "that" delete -- a --.
Claim 10, Column 18, line 17, after "that" delete -- a --.

Signed and Sealed this
Eighteenth Day of August, 2015

Michelle K. Lee
*Director of the United States Patent and Trademark Office*